United States Patent [19]

Renner

[11] Patent Number: 4,757,494
[45] Date of Patent: Jul. 12, 1988

[54] METHOD FOR GENERATING ADDITIVE COMBINATIONS OF PCM VOICE SAMPLES

[75] Inventor: Robert E. Renner, Phoenix, Ariz.

[73] Assignee: GTE Communication Systems Corporation, Phoenix, Ariz.

[21] Appl. No.: 116,181

[22] Filed: Nov. 2, 1987

[51] Int. Cl.⁴ .......................................... H04Q 11/04
[52] U.S. Cl. ...................................... 370/62; 379/202
[58] Field of Search .......................... 370/62; 379/202; 381/119

[56] References Cited

U.S. PATENT DOCUMENTS

| | | | |
|---|---|---|---|
| 4,416,007 | 11/1983 | Huizinga et al. | 370/62 |
| 4,466,092 | 8/1984 | Renner | 370/62 |
| 4,466,093 | 8/1984 | Renner | 370/62 |
| 4,466,094 | 8/1984 | Renner | 370/62 |
| 4,509,166 | 4/1985 | Simon | 370/62 |
| 4,648,089 | 3/1987 | Hsing | 370/62 |

*Primary Examiner*—Douglas W. Olms
*Attorney, Agent, or Firm*—Frank J. Bogacz

[57] ABSTRACT

A method for generating additive combinations of PCM voice samples separates the samples into magnitude portions and sign portions. The magnitude portion of each PCM voice sample is converted from compressed PCM form to linear form. The magnitudes of the two voice samples, in linear form, along with their respective signs are added together to form a resultant linear value. If there is any overflow as a result of the addition, the resultant value is truncated so as not to exceed a maximum allowable value. The resultant value is then converted from linear form to compressed PCM form along with the proper sign. These steps are iterated for each possible value of the input PCM voice samples. These resultant values are stored in a storage medium for rapid on-line use by a switching system. Off-line generation of combined PCM samples saves system real time as compared to generating these combinations on-line in real time.

14 Claims, 4 Drawing Sheets

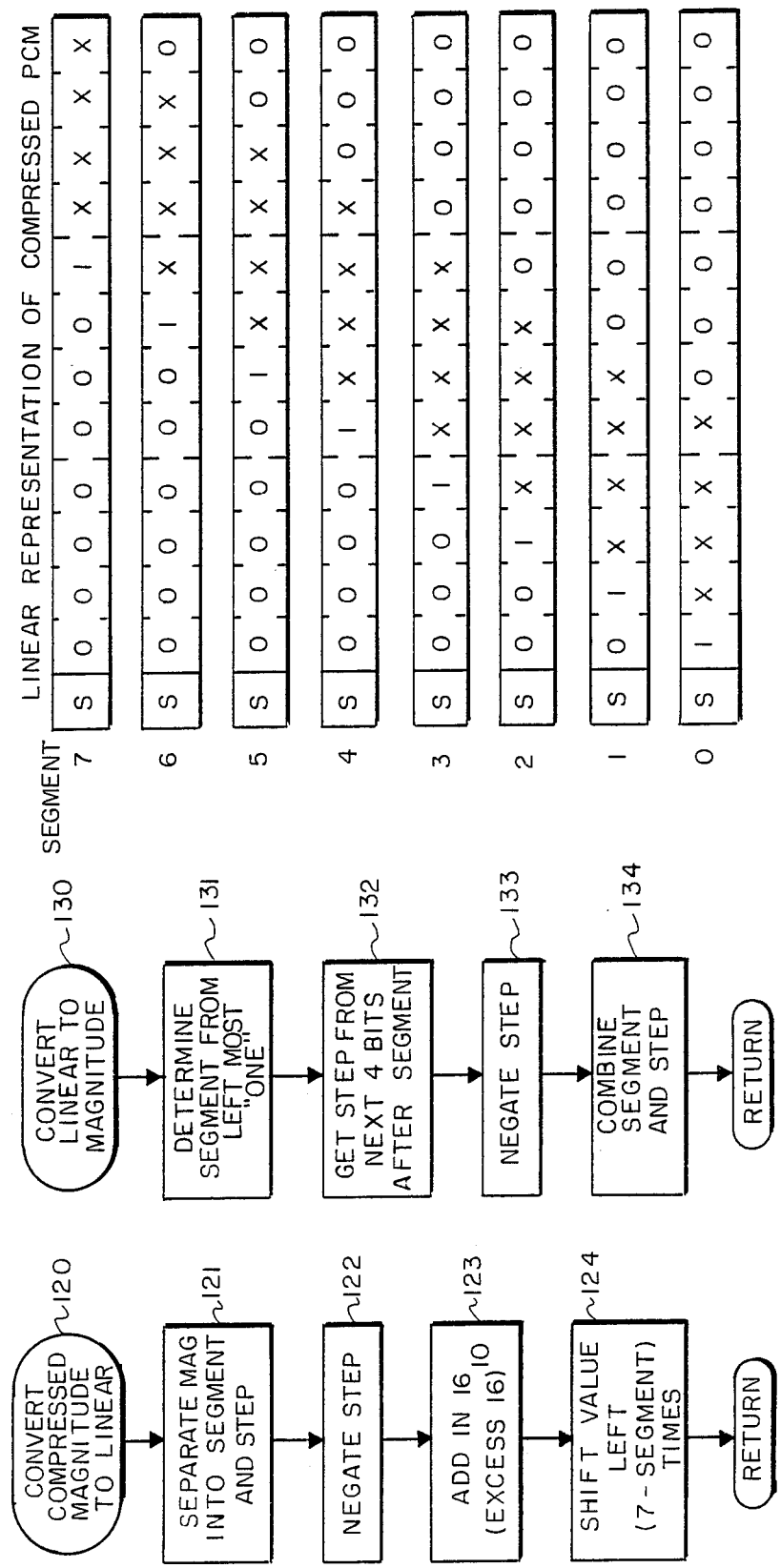

METHOD FOR GENERATING ADDITIVE COMBINATIONS OF PCM VOICE SAMPLES

CROSS-REFERENCE TO RELATED APPLICATIONS

This application is related to co-pending U.S. patent application Ser. No. 116,180, having the same inventive entity and being assigned to the same assignee as the present application. This application is also related to co-pending U.S. patent applications Ser. Nos. 116,182 and 116,183, which have the same assignee as the present application.

BACKGROUND OF THE INVENTION

The present invention generally pertains to a conference calling arrangement for a digital switching network and more particularly to improvements for speaker selection and broadcasting for multi-port conference circuitry.

U.S. Pat. No. 4,466,093 teaches a time shared conference arrangement. U.S. Pat. Nos. 4,466,092 and 4,466,094 also teach similar techniques. The assignee of the present application is the successor in all rights, title and interest to the assignee of the U.S. Pat. No. 4,466,093.

This patent teaches the broadcasting of the "loudest speaker" to the other conferees. A series of on-line comparisons is made between the PCM magnitude levels of up to three conferees. Such on-line comparisons require an amount of switching system real time. Next, this patent teaches the comparison of the loudest detected speaker to a threshold level. If the PCM magnitude of the speakers values exceeds this threshold, then this loudest speaker's PCM sample is broadcast to the other conferees during the appropriate time slots. If the PCM magnitude of the loudest conferee did not exceed the threshold, then the identity of the loudest conferee stored during the previous sampling time period was selected and the corresponding PCM sample broadcast to the other conferees during the appropriate time slots.

This technique provided for rapid switching between the speakers introducing noise. As a result, the overall audible quality broadcast to the conferees was substantially degraded when two or more parties spoke simultaneously.

When multiple sound sources are present, the human ear hears a combination of all the various sources. Some of the sources are louder in amplitude than others. The PCM samples, which represent speech sound, of modern digital networks are not directly combinable. Therefore, the human ear listening via a digital switching system does not hear a true combination of each conferee's speech.

PCM data samples are nonlinear logarithmic representations of human speech. Since these PCM samples are nonlinear, they are difficult to combine. Off-line generation of combined PCM samples saves system real time as compared to generating them on-line each time combination is required.

It is an object of the present invention to provide a method for generating additive combinations of PCM voice samples for rapidly combining PCM voice samples.

SUMMARY OF THE INVENTION

In accomplishing the object of the present invention a novel method for generating in an off-line environment combined PCM voice samples for use in an on-line environment is provided.

A method for generating additive combinations of PCM voice samples first initializes a speaker A index to a predefined value. Next, the method provides for obtaining a magnitude value of a first PCM voice sample. Then, the magnitude of the first PCM voice sample is converted from compressed PCM form to linear form.

Secondly, a speaker B index is initialized to a predefined value. Then, a magnitude value of a second PCM voice sample is obtained. The second PCM voice sample is converted from compressed PCM form to linear form.

The linear forms of the first and second PCM voice samples are combined to form a third PCM voice sample also in linear form. The third PCM voice sample is then converted from linear form to compressed PCM form. Lastly, the third PCM voice sample, in its compressed form, is output to a certain location in a suitable storage medium.

Next, the A speaker index value is incremented by one. Then, all the steps beginning with the obtaining of the second PCM voice sample are repeated, if the second speaker value is less than or equal to a predetermined value. Lastly, the A speaker index value is incremented by one. All the steps beginning with obtaining the A speaker index value are repeated, if the speaker index value is less than or equal to a predetermined value.

BRIEF DESCRIPTION OF THE DRAWINGS

FIGS. 2 through 5 are flow chart diagrams of the method for generating the data contents for the programmable read only memory of the present invention.

FIG. 6 is a bit layout diagram of eight segment linear representations of compressed PCM samples.

FIG. 7 is a partial list of the values of the programmable read only memory of the present invention.

DESCRIPTION OF THE PREFERRED EMBODIMENT

This invention comprises an improvement to U.S. Pat. No. 4,466,093. This application is assigned to the successor of all rights, title and interest of U.S. Pat. No. 4,466,093. U.S. Pat. No. 4,466,093 is hereby incorporated by reference.

Figure 2:
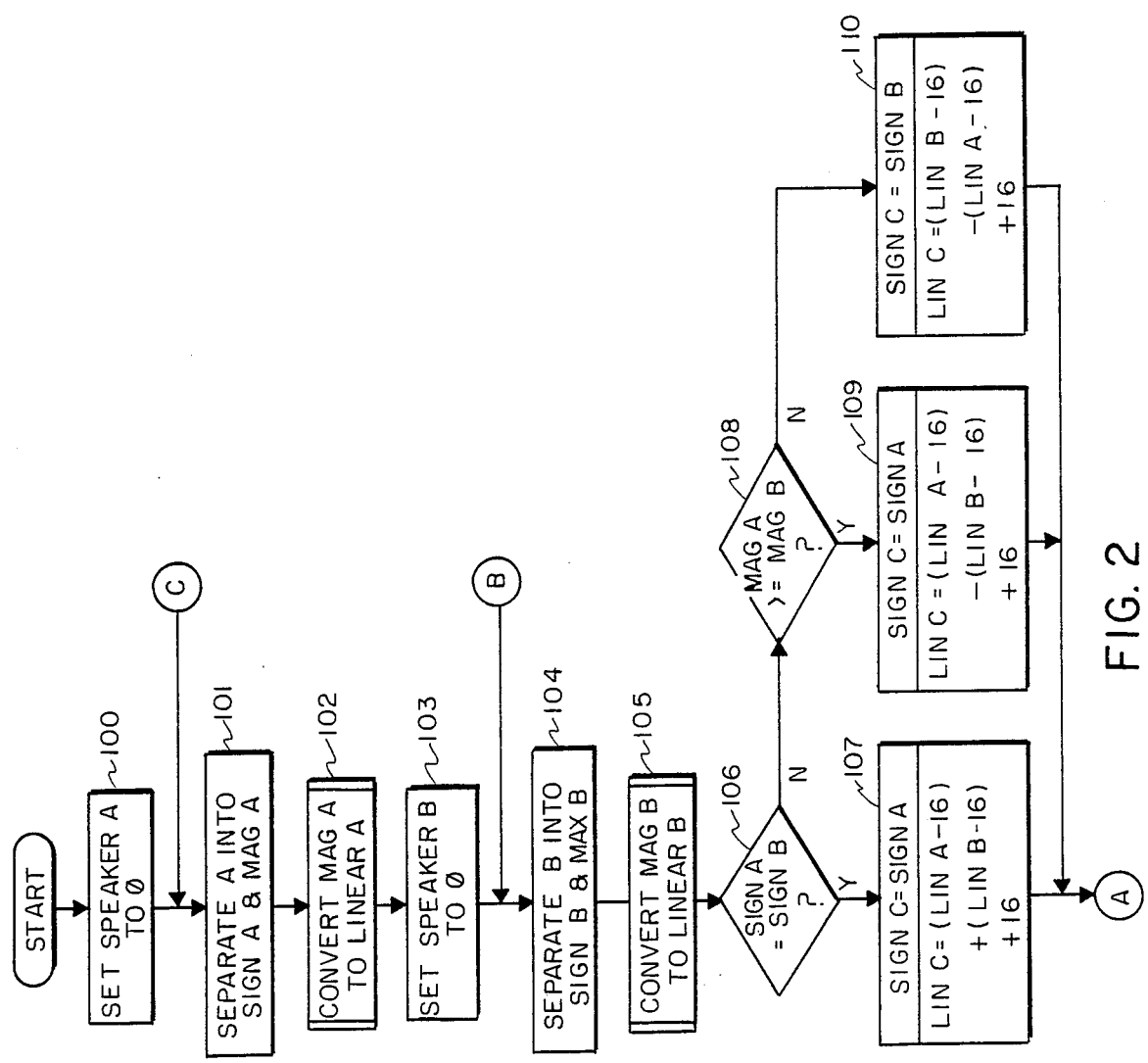

In FIG. 2 of U.S. Pat. No. 4,466,093, last speaker memory 35, speaker select and threshold logic 40 and multiplexer 34 are depicted. The logic details of these functional blocks are shown in FIG. 5 of that patent.

The present invention includes the replacement of last speaker memory 35, speaker select and threshold logic 40 and multiplexer 34 as shown in FIG. 2 of U.S. Pat. No. 4,466,093 with a programmable read only memory. As a result, the logic of FIG. 5 shown in that patent is completely replaced by one integrated circuit programmable read only memory (PROM) of 64 k×8 bits.

Figure 1:
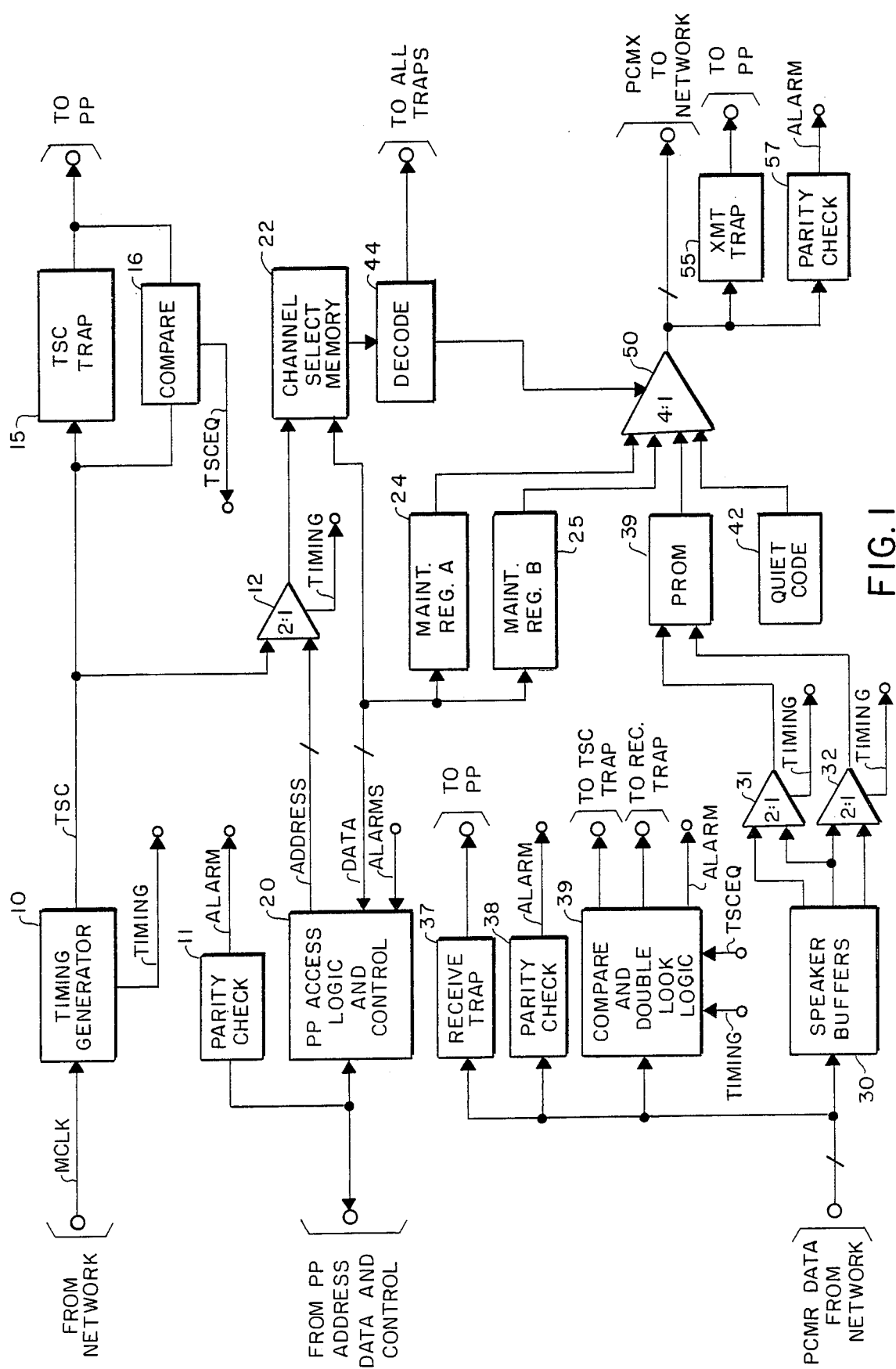
FIG. 1 is a block diagram of the additive PCM circuitry embodying the improvements of the present invention.
Figure 3:
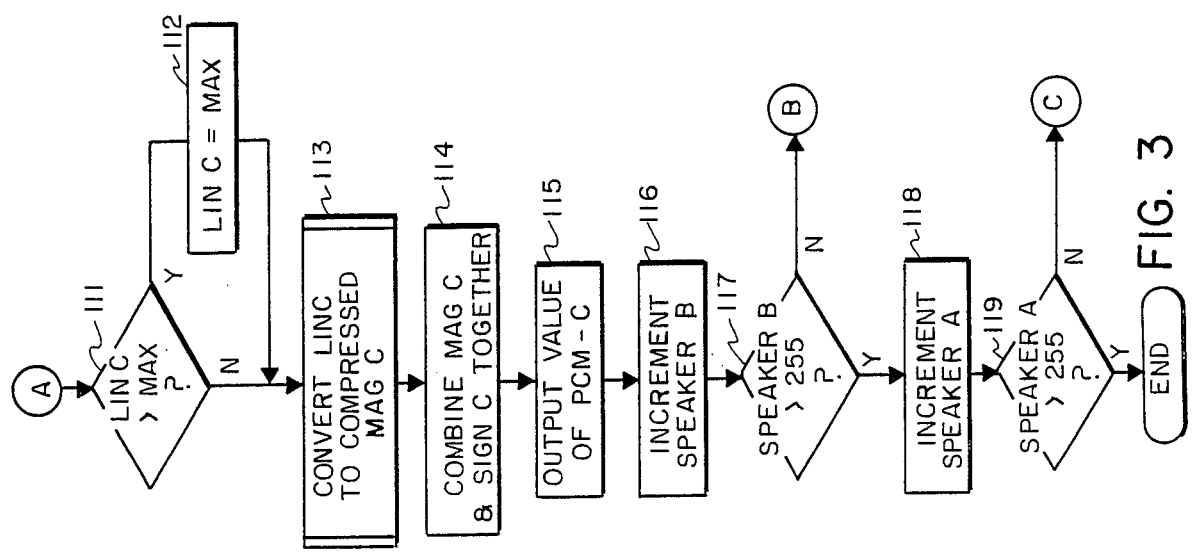

Referring to FIG. 1 of the present application, the PCM received data from the switching network is transmitted from the network via a connection to speaker buffers 30. Speaker buffers 30 operate as shown in U.S. Pat. No. 4,466,093 in FIG. 4 and in the accompanying description in the specification.

During a time slot of the switching system two of the three speaker conferee's PCM samples are output via multiplexers 31 and 32 to PROM 39. That is, 8-bits comprising the PCM sample of speaker A and 8-bits comprising the PCM sample of speaker B are output in one time slot to PROM 39. In another time slot the PCM samples of speakers B and C are output. During last time slot required for this operation, the PCM samples of speakers A and C are output. Each of the speaker's PCM samples is an 8-bit value. The seven least significant bits of this value comprise the magnitude of the speaker's voice sample. The high order or eighth bit is the sign of the voice or speech sample. Each of these 8-bit entities, of the twelve-bits output by the multiplexers 31 and 32, is input as an address to PROM 39.

Each of the 64 k×8-bit locations of PROM 39 has been preprogrammed with values. Each of the 8-bit values stored in PROM 39 represents an additive combination or sum of the magnitude of the two PCM samples input on the buses SPKA and SPKB.

The 8-bits of the SPKA and the SPKB buses, which contain either conferee A's, B's or C's PCM voice samples, are added to one another and the resultant output transmitted from PROM 39 to multiplexer 50 for output to the PCM switching network. By combining the two input samples, the listening conferee receives a true representation of the combination of sounds of the other conferees. In addition, much of the noise from rapid switching is avoided.

Since the PCM values, combined by PROM 39, are nonlinear logarithmic values, the combination is not a straight forward addition. Each 8-bit PCM sample may be represented in a linear form.

An eight segment linear representation of the compressed PCM is shown in FIG. 6. The sign bit is designated by S. The logic zeros and ones are as indicated and the X positions may take on either the value of logic zero or one. As can be seen from FIG. 6, each segment has the values of two times the one preceding it. That is, the possible values of segment 6 are twice as great as the values contained in segment 7. Once speech samples are in linear form, their combination is possible by addition. The translation from compressed PCM to linear and from linear to compressed PCM will be explained infra.

The values contained on the SPKA and SPKB buses form a 16-bit address, which when applied to PROM 39, cause PROM 39 to output the proper combined PCM value of the inputs on the SPKA and the SPKB buses. This arrangement provides for a single chip replacement of all the logic shown in FIG. 5 of U.S. Pat. No. 4,466,093. In addition, processing time of the circuitry is minimized from that shown in FIG. 5 of the U.S. Pat. No. 4,466,093. The present improvement constitutes a single read operation from PROM 39. This saves system real time that may be utilized to provide other features or processing capability in the digital switching network. The value output by PROM 39 is a true combination of the conferees' speech. Due to this combination, no loudest speaker determination need be made and the corresponding logic may be deleted.

Next, referring to FIGS. 2 through 5, an off-line method of generating the contents of PROM 39 is shown. This method is initiated by entering the start block. First, an index for speaker A is set to zero, 100. Next, the PCM voice sample value is separated into two components, the sign bit and seven bits representing the magnitude of speaker A's PCM voice sample 101. Next, the seven magnitude bits of speaker A are converted from compressed PCM to a linear representation 102. Block 102 transfers control to convert compressed magnitude to linear, subroutine 120, shown in FIG. 4, to provide this function.

Next, the initial value of the speaker B index is set equal to zero, block 103. Then, the value of the speaker B PCM voice sample is separated into the sign of the speaker B sample and the seven bit magnitude of the speaker B sample, 104. Block 105 then calls convert compress to linear, subroutine 120, to convert the magnitude of the speaker B sample from compressed PCM to linear form.

Next, block 106 determines whether the sign of sample A is equal to the sign of sample B. If these signs are equal, block 107 is entered. Block 107 sets the sign of sample C, the output sample, equal to the sign of sample A. The value of sample C is the value output from the particular memory byte represented by the corresponding values of samples A and B. The linear value of sample C is then made equal to: the linear value of sample A, minus 16; plus to the linear value of sample B, minus 16; plus 16, block 107.

If the signs of samples A and B are not equal, then block 108 is entered. Block 108 determines whether the magnitude of sample A is greater than or equal to the magnitude of sample B. If the magnitude of sample A is greater than or equal to the magnitude of sample B, then block 109 is entered. Block 109 sets the sign of sample C equal to the sign of sample A. Block 109 also calculates the linear value of sample C to be: the linear value of sample A, minus 16; minus the linear value of B, minus 16; plus 16.

If the magnitude of sample A is not greater than or equal to the magnitude of sample B, block 110 is entered. Block 110 sets the sign of sample C equal to the sign of sample B. Next, block 110 sets the linear value of sample C equal to: the linear value of sample B, minus 16; minus the linear value of sample A, minus 16; plus 16.

After the processing of blocks 107, 109 and 110 are complete, control is transferred to block 111. Block 111 determines whether the linear value of sample C is greater than the maximum allowable value. If the value of sample C is greater than the maximum value, block 112 truncates the value or sets the linear value of sample C equal to the maximum value. Each value 16, mentioned above, is expressed in base ten or decimal.

Block 113 converts the linear value of sample C to the compressed magnitude of sample C by calling, subroutine 130, convert linear to magnitude. Then, the sign of sample C is combined with the magnitude of sample C, which is retrieved from the convert linear to magnitude, block 114. Next, the PCM value of sample C is output to the proper location of the PROM 39. Any threshold level determination, which is desired, may be checked at this time. The output location is the location indexed by the speaker A and B index values combined and used as a 16-bit address.

Next, the value of the speaker B index is incremented by 1, block 116. If the value of the speaker B index is greater than 255, the Y path from block 117 is followed and control is transferred to block 118; otherwise, the N path from block 117 is followed and control is transferred to block 104. Blocks 104 through 117 are iterated for another value of the A and B indices.

Block 118 increments the value of the speaker A index. Next, block 119 determines whether the value of the speaker A index is greater than 255. If the value of the speaker A index is less than or equal to 255, the Y path from block 119 is followed and control is transferred to block 101. The steps of blocks 101 through 119 are iterated for incremented values of the A and B indices. If the speaker B index is less than or equal to 255, the Y path is followed from block 119 and process is ended. The programming process of PROM 39 has been completed.

The convert compressed PCM magnitude to linear values subroutine or procedure 120 is depicted in FIG. 4. When called upon the subroutine is entered via block 120. Next, block 121 separates the magnitude value of the compressed PCM sample into a segment value and a step value. The segment value is the upper 3-bits of the magnitude and the step value is the lower 4-bits of the magnitude. The steps are the values of the X bits of each segment as shown in FIG. 6.

Next, the negative value of the step portion of the magnitude is calculated, block 122. Then, 16 decimal is added to this value, block 123. The resultant value is then shifted left the number of positions equal to seven decimal minus the segment value, block 124. Subroutine 120 returns control and the converted value to the calling block.

FIG. 5 depicts the subroutine for converting linear values to PCM magnitude values. For converting linear values to PCM magnitude block 130 is entered. The segment number is determined by examining the left most bit position containing a logic one bit, block 131. This may be accomplished by iterating left shift, count and test steps. Next, a step number is obtained from the next four bits following this first logic one bit position, block 132. The negative value of the step is obtained, block 133. The step and segment numbers are combined into the proper positions, as shown in FIG. 6, block 134. Then, this subroutine transfers control along with the value calculated to the calling block.

Figure 7:
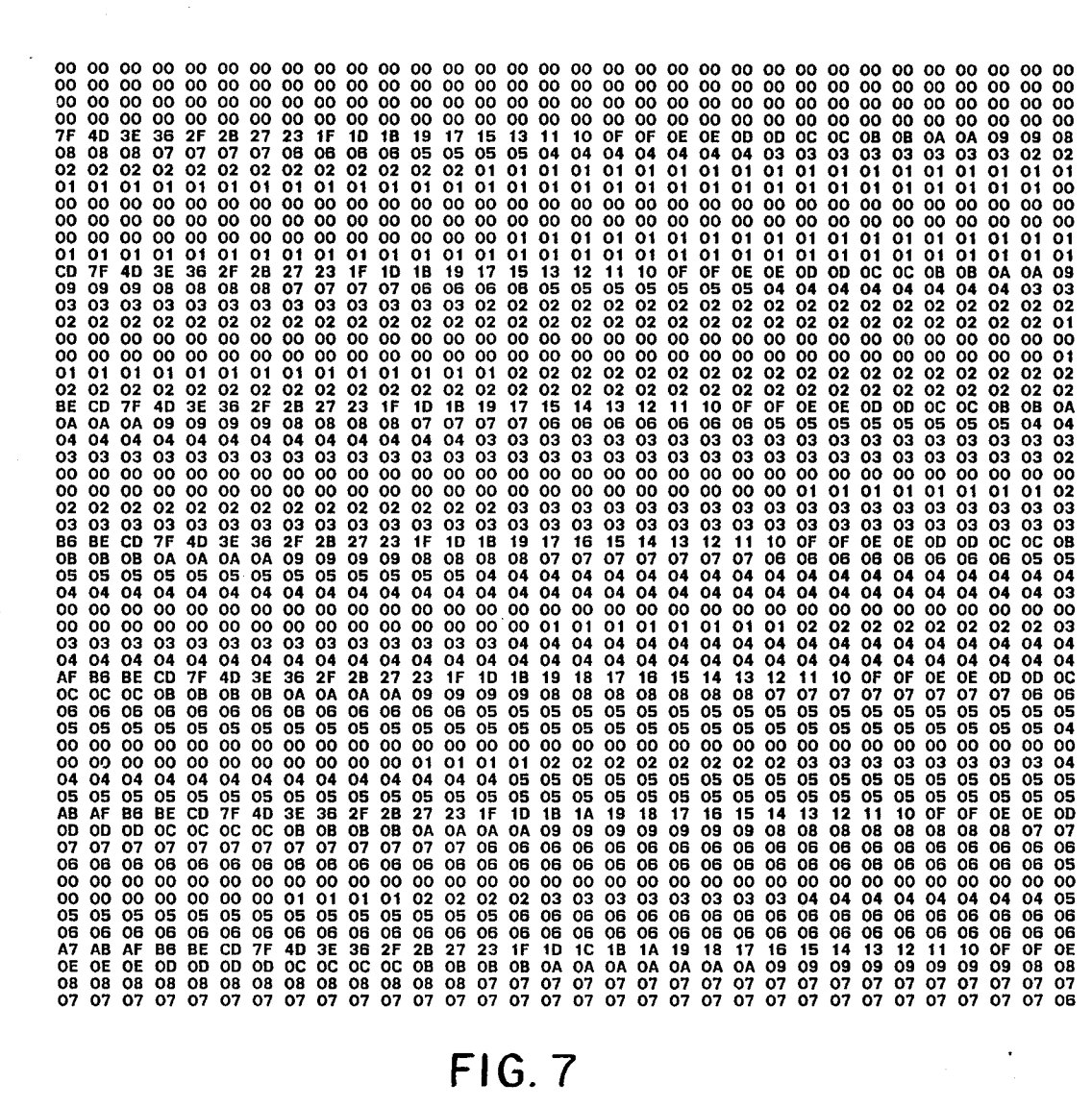

FIG. 7 depicts a portion of the contents of PROM 39. Location 0 is at the upper left of the figure. The figure is read from left to right and top to bottom. The last location shown is location 1,792 base 10 in the lower right hand portion of this figure. Each two digits represent the contents of an 8-bit location within PROM 39. All numbers shown in FIG. 7 are hexadecimal.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A method for generating additive combinations of PCM voice samples, said method comprising:
   first initializing a first speaker index to a predefined value;
   first obtaining a magnitude value of a first of said PCM voice samples;
   first converting said magnitude of said first PCM voice sample from compressed PCM form to linear form;
   second initializing a second speaker index to a predefined value;
   second obtaining a magnitude value of a second of said PCM voice samples;
   second converting said magnitude of said second PCM voice sample from compressed PCM form to linear form;
   combining said linear forms of said first and second PCM voice samples into a third PCM voice sample in linear form;
   third converting said third PCM voice sample from linear form to compressed PCM form;
   outputting said third PCM voice sample in compressed PCM form to a suitable storage medium;
   first incrementing said second speaker index value by one;
   first iterating all said steps beginning with said step of second obtaining, if said second speaker index value is less than or equal to a predetermined value;
   second incrementing said first speaker index value by one; and
   second iterating all said step beginning with said step of first obtaining, if said first speaker index value is less than or equal to said predetermined value.

2. A method for generating additive combinations of PCM voice samples as claimed in claim 1, said step of outputting including the step of storing each of said third PCM voice samples in a location of a programmable read only memory indexed by said first and second speaker index values.

3. A method for generating additive combinations of PCM voice samples as claimed in claim 2, said step of first obtaining including the step of first separating said first PCM voice sample into a magnitude value portion and a sign value portion.

4. A method for generating additive combinations of PCM voice samples as claimed in claim 3, said step of second obtaining including the step of second separating said second PCM voice sample into a magnitude value portion and a sign value portion.

5. A method for generating additive combinations of PCM voice samples as claimed in claim 4, wherein there is further included the steps of:
   first determining whether said first and second sign value portions are equal;
   first setting a sign value portion of said third PCM voice sample equal to said sign value portion of said first PCM voice sample;
   second setting a magnitude value portion of said third PCM voice sample, in linear form, equal to said magnitude value portion of said first PCM sample, in linear form, minus a particular value, added to the magnitude value portion of said second PCM voice sample, in linear form, minus said particular value and added to said particular value; and
   said steps of first determining, first and second setting being performed in response to said determination that said sign value portions of said first and second PCM voice samples are equal.

6. A method for generating additive combinations of PCM voice samples as claimed in claim 5, wherein there is further included the steps of:
   second determining whether said magnitude value portion of said first PCM voice sample is greater than or equal to said magnitude value portion of said second PCM voice sample;
   third setting a sign value portion of said third PCM voice sample equal to the sign value portion of said first PCM voice sample;
   fourth setting a magnitude value portion of said third PCM voice sample, in linear form, equal to said magnitude value portion of said first PCM voice sample, in linear form, minus said particular value, minus said magnitude value portion of said second PCM voice sample, in linear form, minus particular value, plus said particular value; and said steps of second determining, third and fourth setting being performed in response to said determination that said magnitude value portion of said first PCM voice sample is greater than or equal to said magnitude value portion of said second PCM voice sample.

7. A method for generating additive combinations of PCM voice samples as claimed in claim 6, wherein there is further included the steps of:

third determining whether said magnitude value portion of said first PCM voice sample is less than said magnitude value portion of said second PCM voice sample;

fifth setting said sign value portion of said third PCM voice sample equal to said sign value portion of said second PCM voice sample;

sixth setting a magnitude value of said third PCM voice sample, in linear form, equal to said magnitude value of said second PCM voice sample, in linear form, minus said particular value, minus said magnitude value portion of said first PCM voice sample, in linear form, minus said particular value, plus said particular value; and said steps of third determining, fifth and sixth setting being performed in response to said determination that said magnitude value portion of said first PCM sample is less than said magnitude value portion of said second PCM sample.

8. A method for generating additive combinations of PCM voice samples as claimed in claim 7, wherein there is further included the steps of:

fourth determining whether said magnitude value portion of said third PCM voice sample, in linear form, is greater a the maximum allowable value;

seventh setting said magnitude value portion of said third PCM voice sample, in linear form, equal to said maximum allowable value in response to said determination that said third PCM voice sample exceeded said maximum allowable value; and said steps of fourth determining and seventh setting being performed in response to said steps of second setting, fourth setting and sixth setting.

9. A method for generating additive combinations of PCM voice samples as claimed in claim 8, wherein there is further included the step of second combining said sign value portion of said third PCM voice sample with said magnitude value portion of said third PCM voice sample in compressed PCM form, said step of second combining being performed in response to said step of third converting.

10. A method for generating additive combinations of PCM voice samples as claimed in claim 9, said particular value being equal to the value of 16 decimal.

11. A method for generating additive combinations of PCM voice samples as claimed in claim 10, said step of first converting including the steps of:

third separating said first PCM voice sample in compressed PCM form into a segment value and a step value;

negating said step value to form a resultant value;

adding 16 decimal to said resultant value;

shifting said resultant value left by 7 minus said segment value times; and providing said shifted resultant value for said step of combining.

12. A method for generating additive combinations of PCM voice samples as claimed in claim 10, said step of second converting including the steps of:

third separating said second PCM voice sample in compressed PCM form into a segment value and a step value;

negating said step value to form a resultant value;

adding 16 decimal to said resultant value;

shifting said resultant value left by 7 minus said segment value times; and providing said shifted resultant value for said step of combining.

13. A method for generating additive combinations of PCM voice samples as claimed in claim 10, said step of third converting including the steps of:

fifth determining a segment value of said third PCM voice sample, in linear form;

third obtaining a step value, said step value being the right adjacent 4-bits to said segment value;

negating said step value to produce a resultant value;

third combining said segment value and said resultant value; and providing said combined segment value and resultant value for said step of second combining.

14. A method for generating additive combinations of PCM voice samples as claimed in claim 13, said step of fifth determining including the steps:

shifting said magnitude value portion of said third PCM voice sample, in linear form, to the left by one bit position;

third incrementing a segment value count by one;

testing a left most bit position for a logic one; and third iterating said steps of shifting, third incrementing and testing until said logic one bit position is determined.

* * * * *